United States Patent
Wang et al.

(10) Patent No.: US 12,487,309 B2
(45) Date of Patent: Dec. 2, 2025

(54) SMART CURRENT TRANSFORMER SYSTEM

(71) Applicant: Accuenergy (Canada) Inc., Toronto (CA)

(72) Inventors: Yufan Wang, Toronto (CA); Ketao Li, Toronto (CA); Liang Wang, Toronto (CA)

(73) Assignee: Accuenergy (Canada) Inc. (CA)

( * ) Notice: Subject to any disclaimer, the term of this patent is extended or adjusted under 35 U.S.C. 154(b) by 127 days.

(21) Appl. No.: 18/230,758

(22) Filed: Aug. 7, 2023

(65) Prior Publication Data

US 2025/0052844 A1     Feb. 13, 2025

(51) Int. Cl.
*G01R 35/00*     (2006.01)

(52) U.S. Cl.
CPC .................... *G01R 35/005* (2013.01)

(58) Field of Classification Search
CPC .... G01R 15/183; G01R 35/02; G01R 35/005; G01R 1/00; G01R 3/00; G01R 5/00; G01R 7/00; G01R 9/00; G01R 11/00; G01R 13/00; G01R 15/00; G01R 17/00; G01R 19/00; G01R 21/00; G01R 22/00; G01R 23/00; G01R 25/00; G01R 27/00; G01R 29/00; G01R 31/00; G01R 33/00; G01R 35/00; H01F 27/402; H01F 27/427; H01F 38/28; H01F 1/00; H01F 3/00; H01F 5/00; H01F 6/00; H01F 7/00; H01F 10/00; H01F 13/00; H01F 17/00; H01F 19/00; H01F 21/00; H01F 27/00; H01F 29/00; H01F 30/00; H01F 36/00; H01F 37/00; H01F 38/00; H01F 41/00
See application file for complete search history.

(56) References Cited

U.S. PATENT DOCUMENTS

| | | |
|---|---|---|
| 8,600,695 B2 | 12/2013 | Cook |
| 9,146,264 B2 | 9/2015 | Cook |
| 11,087,643 B2 | 8/2021 | Pries et al. |
| 2005/0143941 A1* | 6/2005 | Forth ................ G06Q 30/0631 702/61 |
| 2022/0003828 A1* | 1/2022 | Klumper ................ G01R 35/02 |

\* cited by examiner

*Primary Examiner* — Judy Nguyen
*Assistant Examiner* — Brent J Andrews
(74) *Attorney, Agent, or Firm* — Dhiraj Jindal; PATENT YOGI LLC (57) ABSTRACT

The present invention relates to a system for calibrating a current transformer, aimed at enhancing the accuracy of current measurements. The system comprises a current transformer equipped with a non-volatile memory, configured to store a unique identifying serial number. In conjunction with this, a power meter is set up to communicate with the current transformer. The power meter is fitted with a reading module designed to read the unique identifying serial number from the non-volatile memory of the current transformer. The system also includes a server, connected to communicate with the power meter. The server possesses a database that stores calibration data associated with the unique identifying serial numbers. The server is programmed to receive the unique identifying serial number from the power meter and transmit the corresponding calibration data back to the power meter, enabling precise calibration of the current transformer.

12 Claims, 4 Drawing Sheets

SMART CURRENT TRANSFORMER SYSTEM

FIELD OF THE INVENTION

The present invention relates to the field of electrical current and energy measurement and management systems. More particularly, the present invention relates to a smart current transformer system.

BACKGROUND OF THE INVENTION

A current transformer (CT) is a type of transformer that is used to measure alternating current (AC). It produces a current in its secondary which is proportional to the current in its primary. Current transformers are commonly used in metering and protective relays in the electrical power industry. They are instrumental in the safe handling of high voltage measurements, converting the high voltage or current down to a lower level for devices to measure.

A current transformer typically consists of numerous turns of wire encircling the cross-section of a toroidal core. The cable carrying the load current runs through the opening at the center of the toroidal core, forming the primary winding of the transformer. The wire encircling the core's cross-section make up the secondary winding. The primary current flowing in the primary winding generates a corresponding secondary voltage and current in the secondary winding. This secondary current is directly proportional to the primary current. The secondary winding is commonly linked to a set of resistors, and the primary current's magnitude is calculated based on the output voltage from this resistor network. Since the primary winding is a single loop, the secondary current ($I_2$) ideally equals the load current ($I_1$) in the primary winding divided by the number of loops in the secondary winding, expressed as:

$$I_1 = I_2(n) \quad (1)$$

where n=number of turns in the secondary winding.

Figure 1:
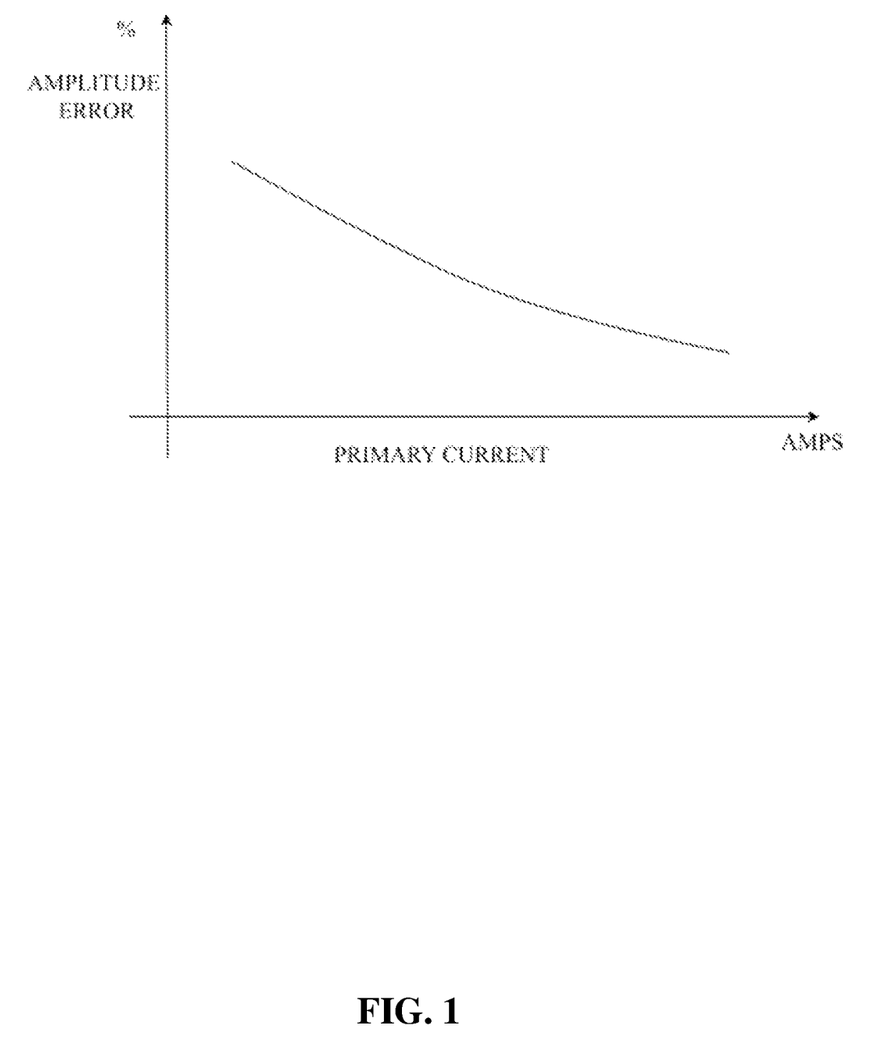
FIG. 1 is a graph of ratio error versus primary current for an exemplary current transformer.

However, real-world transformers are not perfect, and the core's magnetization introduces errors that affect the meter's accuracy. A portion of the primary winding's current is used to magnetize the transformer core, resulting in a smaller secondary current than expected from the multiplication of the primary current and the turns ratio. As illustrated in FIG. 1, the ratio error ($r_e$) changes with the magnitude of the primary current ($I_1$) as follows:

$$r_e(\%) = K_3 + K_4(\log I_1) \quad (2)$$

where $K_3$ and $K_4$ are constants.

The ratio error modifies the relationship between the measured secondary current ($I_2$) and the primary current ($I_1$), causing it to deviate from the theoretical relationship to:

$$I_1 = I_2' \ (n + n\, r_e/100) \quad (3)$$

where $I_2'$=measured secondary current.

Moreover, the measured secondary current's magnitude ($I_2'$) relates to the theoretical secondary current ($I_2$) as follows:

$$I_2 = I_2' \ (1 + r_e/100) \quad (4)$$

Figure 2:
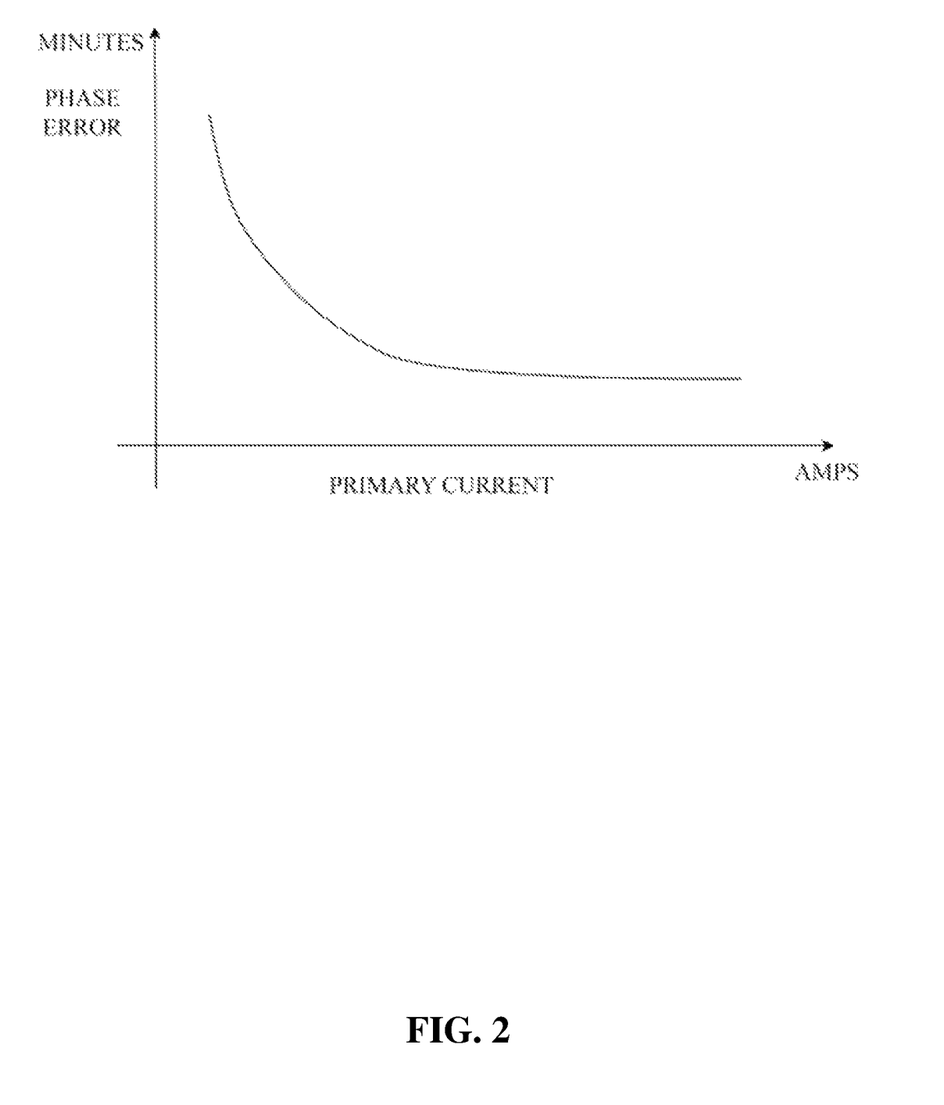
FIG. 2 is a graph of phase error versus primary current for an exemplary current transformer.

Furthermore, the magnetization of the transformer core and windings results in a phase shift between the primary and secondary winding currents. Due to the inductive nature of the transformer core, the secondary current's phase lags the primary current's phase. As depicted in FIG. 2, the phase error ($p_e$) changes with the primary current's magnitude ($I_1$) as per the equation:

$$p_e = K_1 + K_2(I_1^{-M}) \quad (5)$$

where M, K1, and K2 are constants.

In practical scenarios, M often approximates ½, allowing for the use of a square root approximation in the overall correction algorithm. The constants $K_1$, $K_2$, $K_3$, and $K_4$ are influenced by the specific current transformer's configuration, including factors like core material and turns ratio, and are typically determined through experimental testing on samples of a given core configuration. Normally, $K_1$, $K_2$, $K_3$, and $K_4$ are ascertained for a specific transformer configuration or production batch by comparing the actual performance of a transformer sample against the performance of a standard device when the secondary winding is connected parallel to a specific impedance or burden.

Typically, the error correction factors are generated from a sample of a particular transformer configuration and stored in the memory of the meter's data processing system, often as a table or a mathematical formula relating the error factors to the magnitude of the sensed current. When the current is sampled, the data processing system looks up or calculates the appropriate error correction factors for a current equal to the sensed current and adjusts the magnitude of the sensed current as required by the ratio and phase error correction factors.

Since the phase and ratio errors are peculiar to a particular current transformer or batch of current transformers, maintaining the desired accuracy of the power meter when replacing or adding a current transformer often necessitates reprogramming the meter to update the phase and ratio error correction factors for the new transformer.

What is desired, therefore, is a current transformer whose phase and ratio error correction factors can be programmed in a power meter easily and accurately.

SUMMARY OF THE INVENTION

This invention pertains to a system and method for calibrating a current transformer. The current transformer is equipped with a non-volatile memory, which could be an Electrically Erasable Programmable Read-Only Memory (EEPROM), storing a unique identifying serial number. This number is read by a power meter using a reading module and is then transmitted to a server.

The server maintains a database with calibration data associated with each unique identifying serial number. Upon receiving the serial number from the power meter, the server retrieves and transmits the corresponding calibration data back to the power meter. This calibration data is updated in the server's database at regular intervals. The power meter stores this calibration data for future reference and uses it to perform calibration operations on the current transformer.

The communication between the power meter and the current transformer is facilitated via a dedicated cable, and the power meter is configured to read the unique identifying serial number at predetermined time intervals. Notifications may be transmitted from the server to the power meter when updates to the calibration data occur.

This invention provides an effective system and method for ensuring the accuracy of current transformers through frequent and automated calibration processes.

DETAIL DESCRIPTIONS OF THE INVENTION

Embodiments of the present disclosure will be described herein with reference to the accompanying drawings. In the following descriptions, well-known functions or constructions are not described in detail to avoid obscuring the present disclosure. The word "exemplary" is used herein to mean "serving as an example." Any configuration or design described herein as "exemplary" is not to be construed as preferred, or advantageous, over other configurations or designs. Herein the phrase "coupled" is defined as "directly connected to or indirectly connected with" one or more intermediate components. Such intermediate components may include both hardware and software-based components.

It is further noted that, unless otherwise indicated, all functions described herein may be implemented in either software, hardware, or some combination thereof.

It should be recognized that the present disclosure can be performed in numerous ways, including as a process, an apparatus, a system, a method, or a computer-readable medium such as a computer storage medium.

Figure 3:
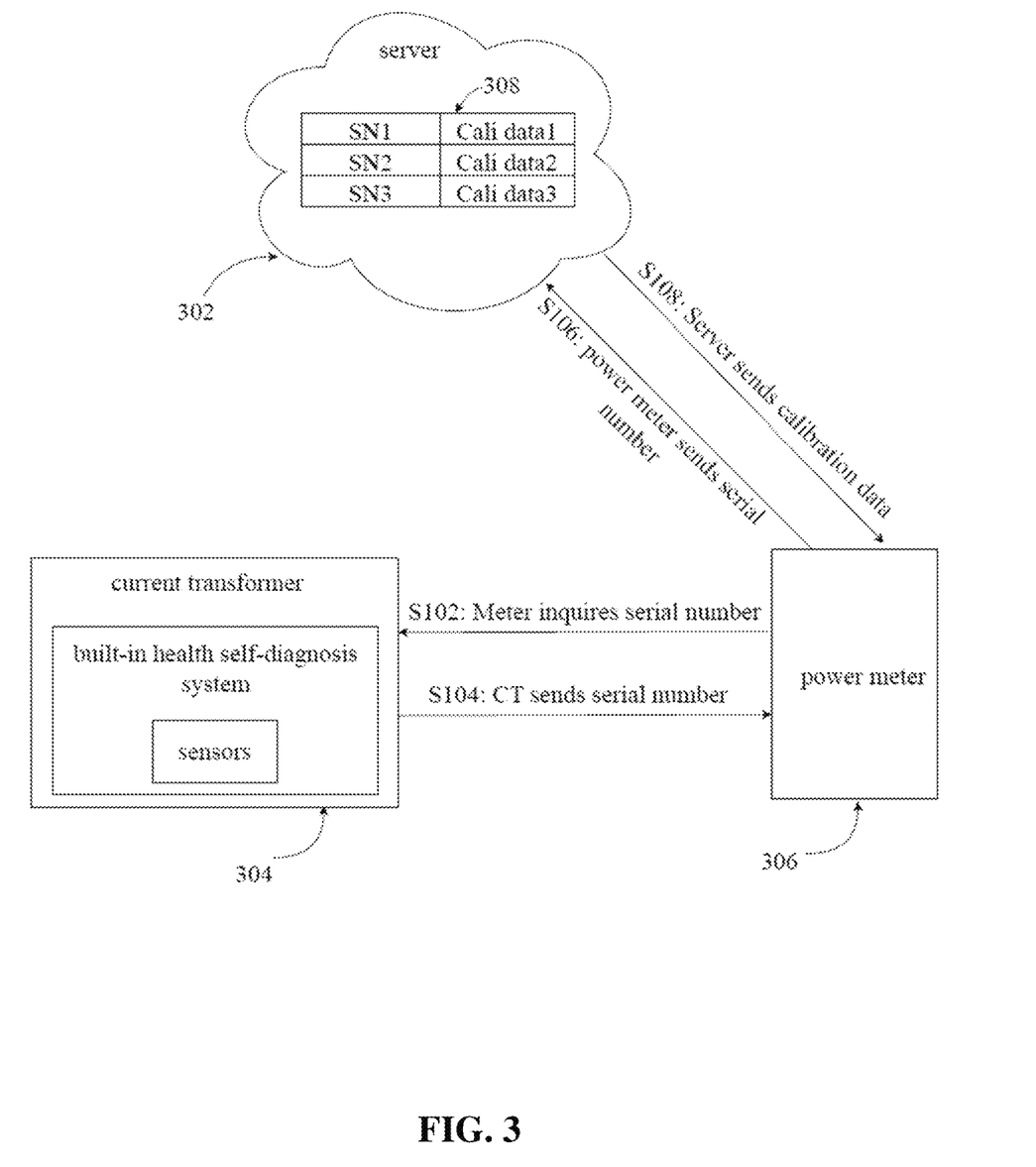
FIG. 3 is a schematic diagram of a current transformer and power meter installation system according to some embodiments of the invention.

FIG. 3 illustrates a schematic diagram of a current transformer and power meter installation system according to some embodiments of the invention.

The diagram also showcases process for calibrating a current transformer 304 using a cloud-based server 302 to enhance the precision of current measurements. The key constituents in the diagram are the server 302, the current transformer 304, and the power meter 306, which all interact in a specified sequence.

The process commences with step S102, where the power meter 306 sends an inquiry to the current transformer 304 for its unique serial number stored in the EEPROM. This communication occurs through a dedicated cable that connects the power meter to the transformer. This cable serves a dual purpose: it allows the secondary current from the transformer to flow to the power meter 306, facilitating the measurement of this current, and it enables the power meter to access the EEPROM to retrieve the stored serial number.

In the context of the current transformer 304 described above, the Electrically Erasable Programmable Read-Only Memory (EEPROM) is used as a storage medium for the transformer's unique identifying serial number. However, other types of non-volatile memory could also fulfill this role. The unique identifying serial number is a specific identifier assigned to each current transformer. It is stored within the non-volatile memory on the current transformer. This serial number is unique to each transformer, providing a way to differentiate between different transformers in the system. This unique identifying serial number plays a crucial role in the calibration process, as it is used to retrieve specific calibration data from the server's database. The serial number is designed to be permanently stored, retaining the information even in the event of power loss.

Non-volatile memory is a type of computer memory that can retain the stored information even after the power is turned off. In contrast, volatile memory requires power to maintain the stored information. Given this characteristic, non-volatile memory is an ideal choice for storing permanent data such as device identification.

Upon receiving the inquiry, the current transformer 304 responds in step S104 by sending its serial number back to the power meter 306 via the same dedicated cable.

There is a reading module in the power meter 306 to execute S102 and S104. The reading module is an integral part of the power meter in our system. It is configured to interact with the non-volatile memory present on the current transformer. This interaction is specifically designed for the purpose of reading and extracting the unique identifying serial number stored on the non-volatile memory. The reading module is composed of both hardware and software components which work in unison to achieve this task. The hardware is designed to facilitate communication with the current transformer, while the software portion is programmed to understand the data structure of the non-volatile memory and correctly interpret the unique identifying serial number.

In some embodiments of the present invention, the reading module included within the power meter is endowed with additional functionality. In addition to its capability of reading the unique identifying serial number from the non-volatile memory of the current transformer, the reading module is configured to perform this operation at predetermined time intervals.

The process of retrieving the unique identifying serial number at regular intervals can be essential for various reasons. It can facilitate the ongoing verification of the current transformer's identity, ensuring that the power meter is still connected to the appropriate current transformer. This continuous verification process could be particularly important in environments where multiple current transformers are present, as it helps avoid any potential mix-ups in data and calibration accuracy.

The predetermined time intervals for retrieval could be set based on the specific needs and characteristics of the system's operational context. For instance, in some implementations, the reading module might retrieve the serial number every few seconds, minutes, or hours. In other cases, the retrieval might occur at the beginning of each operational cycle of the power meter or current transformer. The flexibility in setting these intervals allows the system to adapt to various usage scenarios and requirements.

Therefore, this additional configuration of the reading module further enhances the system's robustness and adaptability, making it more reliable and suitable for a wider range of applications. Moreover, it helps in maintaining the consistency and accuracy of calibration data over time, contributing to improved overall performance of the system.

After obtaining the serial number, in step S106, the power meter 306 transmits this information to the server 302. This communication may be facilitated through a secure and encrypted internet connection, ensuring data integrity and confidentiality.

For the communication between the power meter 306 and the server 302, this could also be achieved via numerous communication methods, depending on the specific setup and requirements. It could be through a wired Ethernet connection, a Wi-Fi connection, a cellular network, or even a long-range, low-power wireless technology like LoRaWAN (Long Range Wide Area Network). The choice would be largely dependent on factors such as the location of the devices, the available infrastructure, and the specific requirements related to data rate, range, power consumption, and cost.

In step S108, the server 302, upon receiving the serial number, retrieves the corresponding calibration data from its comprehensive database via an internal process. This database holds a lookup table 308 linking unique serial numbers to specific calibration data sets. Once the relevant data is obtained, the server 302 sends this calibration data back to the power meter 306 via the same secure internet connection. The database is a crucial component of the server within the system. It is used to store calibration data corresponding to unique identifying serial numbers of a variety of current transformers. This calibration data is essential for the accurate operation of the current transformer. The database operates in conjunction with server-side software which uses the received unique identifying serial number from the power meter to query the database and retrieve the corresponding calibration data. This database is maintained and updated on a regular basis to ensure the calibration data for each current transformer is up to date and accurate.

In some embodiments of the invention, the server's database exhibits enhanced functionality. Notably, it is configured to update the calibration data associated with each unique identifying serial number on a regular basis.

Calibration data is a fundamental aspect of this system as it allows for precise current measurements. However, this data may evolve over time due to factors such as aging of the current transformer, alterations in its physical or electrical properties, or changes in the operational environment. Therefore, to maintain the accuracy and relevance of the calibration data, it is crucial to update it periodically.

The database in the server is configured to accommodate these updates. This could involve the server receiving new calibration data from a calibration source, such as a calibration lab or an automated calibration system, at regular intervals. These intervals could be predefined based on various factors, such as the expected drift in calibration over time, the operational context of the current transformer, or regulatory requirements.

Upon receiving new calibration data, the database is configured to replace the existing calibration data associated with the respective unique identifying serial number. This ensures that the calibration data stored in the database remains current and reliable, thereby enhancing the accuracy of the current measurements.

When an update to the calibration data corresponding to a specific serial number occurs, the server is configured to automatically generate a notification.

This notification, which may be a message or signal, is then transmitted to the power meter associated with that unique identifying serial number. The transmission of this notification can be facilitated through the same communication channel used for transmitting the calibration data and the unique identifying serial number. This could involve wired or wireless communication protocols, including but not limited to Ethernet, Wi-Fi, Bluetooth, or cellular networks.

The purpose of this notification is to alert the power meter about the updated calibration data. Upon receiving this notification, the power meter can then initiate a process to retrieve the new calibration data from the server. This ensures that the power meter is always equipped with the most up-to-date calibration data, leading to more accurate calibration of the current transformer and hence, more precise current measurements.

Finally, the power meter 306, equipped with the new calibration data, can precisely calibrate the current measurements it takes from the current transformer 304, thereby significantly enhancing measurement accuracy.

In some embodiments, an additional functionality of the power meter is highlighted. The power meter, apart from reading the unique identifying serial number from the current transformer's non-volatile memory and communicating with the server, is further configured to store the received calibration data for future reference.

This stored calibration data has significant implications for the system's performance. Once the power meter receives the calibration data from the server, it can store this data in its internal memory. This could be a non-volatile memory module to ensure the data is retained even when the power meter is powered off or during power interruptions.

The power meter uses this stored calibration data to calibrate the current measurements it obtains from the current transformer. By storing the calibration data, the power meter eliminates the need to request this data from the server each time it takes a current measurement, thus enhancing efficiency.

Moreover, having the calibration data readily available in the power meter's memory can facilitate offline operation. In situations where the power meter is temporarily unable to communicate with the server, it can continue to perform accurate current measurements using the last received and stored calibration data.

Figure 4:
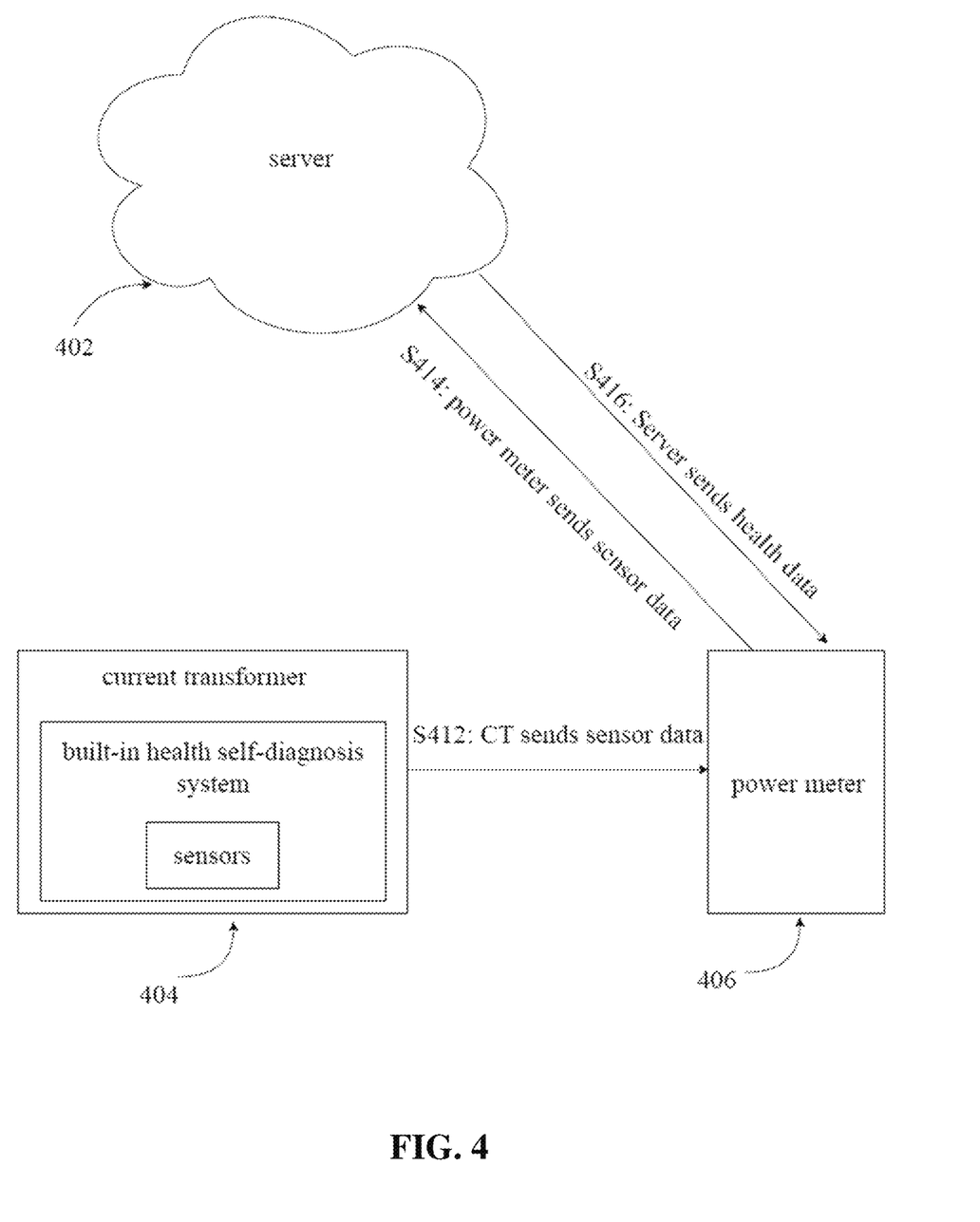
FIG. 4 is a schematic diagram of a system for managing the health status of a current transformer according to some embodiments of the invention.

FIG. 4 illustrates a schematic diagram of a system for managing the health status of a current transformer, with a particular emphasis on enhancing reliability and efficiency of current measurements and transformer maintenance.

The central element of this system is a current transformer 404 equipped with a built-in health self-diagnosis system. This diagnostic system comprises several strategically placed sensors within the transformer. These sensors are designed to continuously monitor various parameters indicative of the transformer's performance and condition, such as temperature, vibration levels, magnetic field intensity.

A temperature sensor in the built-in health self-diagnosis system can monitor the overheating issue. Overheating can be caused by overload, poor ventilation, or degraded insulation. The excessive heat can cause the transformer's insulation to deteriorate more quickly, reducing its lifespan. Over time, overheating can lead to transformer failure.

An accelerometer can be used to detect vibration levels. Unusual vibration patterns can indicate mechanical issues, like loose connections or parts, structural damage, or imbalances in the magnetic core. Such issues can reduce the transformer's efficiency, cause erroneous measurements, and lead to premature failure if not addressed.

A magnetic field sensor, or magnetometer, can monitor the magnetic field intensity inside the transformer. Deviations from the expected magnetic field can indicate problems with the magnetic core, such as saturation or uneven distribution. This can impact the transformer's ability to accurately step down the current, potentially leading to inaccurate measurements.

The built-in health self-diagnosis system is responsible for collecting parameters through the sensors. This raw data collected by the sensors is then digitally encoded and transmitted via the dedicated cable connecting the transformer to the power meter. This cable serves a dual purpose: it allows for the transmission of the secondary current from the transformer 404 to the power meter 406 for measurement, and it enables the transfer of the sensor data.

To maintain cost-efficiency while enabling effective communication between the current transformer 404 and the power meter 406, a simple yet robust interface can be designed using a Serial Peripheral Interface (SPI) bus.

The SPI bus is a synchronous serial data link that operates in full duplex mode. It is a simple and cost-effective interface that allows microcontrollers and peripheral devices, like sensors, to communicate with each other. It requires fewer wires compared to other interfaces, reducing the costs associated with hardware and installation.

In this design, the SPI bus can be integrated onto the printed circuit board of the current transformer. The health self-diagnosis system collects raw data from the sensors and transmits this data to the power meter via the SPI bus.

The SPI bus operates on a master-slave concept, with the microcontroller on the current transformer acting as the master, controlling the data flow, and the reading module on the power meter acting as the slave, receiving the data. The SPI bus uses four lines: a clock line (SCLK), a master output/slave input line (MOSI), a master input/slave output line (MISO), and a slave select line (SS). These lines enable full-duplex data transmission between the master and the slave.

To ensure reliability and integrity of the data, error checking mechanisms such as Cyclic Redundancy Check (CRC) can be implemented. The microcontroller adds a CRC checksum to the end of each data packet before sending it over the SPI bus. Upon receiving a packet, the power meter computes its own CRC from the received data and compares it with the received checksum. If the values match, the data is considered to be error-free.

Such a low-cost SPI-based interface allows for the reliable and efficient transfer of raw sensor data from the current transformer to the power meter, supporting the overall goal of enhancing the reliability and cost-effectiveness of the transformer health self-diagnosis system.

Upon receiving the sensor data and the secondary current, the power meter digitally encodes secondary current to obtain the current flow data. Then the power meter 406 forwards all the data including the sensor data and the current flow data to a cloud-based server 402 via a secure communication protocol. The server 402 is integral to the system and is tasked with processing the received data. It employs advanced algorithms to assess the transformer's health status.

The server 402 then applies predefined rules to assess the current transformer's health based on the statistical analysis. Hereunder is an illustrative example of predefined rules that can be considered to assess the current transformer's health based on statistical analysis:

Rule 1: Overheating Issue

This rule could be triggered if the mean temperature (T_mean) over the last 24 hours exceeds a certain threshold (T_threshold). For example:

If T_mean>T_threshold, then Overheating Issue is flagged.

The threshold could be set based on the operational limits of the current transformer, for example, it could be 85 degrees Celsius.

Rule 2: Vibration Issue

This rule could be activated if the variance of the vibration levels (V_variance) increases beyond a certain point (V_threshold). For instance:

If V_variance>V_threshold, then Vibration Issue is flagged.

The threshold could be defined based on empirical evidence about the acceptable level of vibration for the specific transformer model.

Rule 3: Magnetic Field Discrepancy

Magnetic field intensity (M) is an important parameter for a current transformer. This rule could be triggered if the magnetic field deviates from the expected value (M_expected) by more than a certain percentage (M_deviation). For example:

If I(M−M_expected)/M_expectedl>M_deviation, then Magnetic Field Discrepancy is flagged.

The expected magnetic field can be a predetermined value specific to the transformer model, and the allowed deviation can be set based on the tolerable performance limit, say 5%.

Rule 4: Current Flow Anomaly

This rule would be triggered if the current flow (C) falls outside the expected range (C_min, C_max). This could be formalized as:

If C<C_min or C>C_max, then Current Flow Anomaly is flagged.

The expected range for current flow would be based on the rated operational range of the transformer.

To provide a quantifiable health index for the current transformer, the system could assign a weightage to each of the health rules based on their relative importance or potential impact on the transformer's operation. The total health index could then be calculated as a sum of these weighted rule outcomes.

The formula for the Health Index (HI) could be expressed as follows:

$$HI = w1*H1 + w2*H2 + w3*H3 + w4*H4$$

where:

HI represents the Health Index.

w1, w2, w3, w4 are the weights assigned to each health rule. These weights represent the relative importance of each rule. For instance, if overheating is considered to have more potential impact than other issues, it may be given a higher weight.

H1, H2, H3, H4 are the outcomes of each health rule. These could be binary (1 if the rule is triggered, 0 if not), or could be continuous values reflecting the severity of the issue (for example, the percentage by which the actual value exceeds the threshold).

For example, if overheating is given a weight of 0.4, vibration issues a weight of 0.3, magnetic field discrepancies a weight of 0.2, and current flow anomalies a weight of 0.1, then the Health Index would be a sum of these four weighted outcomes.

This is an illustrative simple model, and the actual implementation might involve a more complex calculation, possibly including additional factors and rules. Furthermore, the weights and thresholds should be set based on empirical evidence and expert knowledge about the operational characteristics and failure modes of the transformers. After the health status is determined by the server 402, the Health Index may be sent to power meter 306.

At the power meter 406, the health status determined by the server 402 can be received and can be displayed on its user interface, providing operators with real-time visibility of the transformer's health. Additionally, the power meter can adjust its measurement and calibration routines based on the received health status, ensuring consistent and accurate current readings.

The server 402 maintains a comprehensive database that archives the historical sensor data from each transformer. The database organizes the data by sensor type, transformer serial number, date, and timestamp for easy retrieval and analysis. The four main types of sensor data include temperature readings, vibration levels, magnetic field measurements and current flow rates.

Trend analysis involves monitoring changes in these parameters over time to identify patterns, such as gradual increases in temperature or vibration, sudden changes in magnetic field strength. By analyzing these patterns, the server 402 can identify warning signs of potential issues, allowing for pre-emptive measures to be taken before a failure occurs.

To perform trend analysis, the server 402 uses statistical techniques such as moving averages, regression analysis, and standard deviation calculations. For example, if the moving average of temperature readings starts to increase over time, this could indicate a possible overheating issue. Similarly, an increasing standard deviation in vibration levels might suggest a mechanical problem within the transformer.

The server 402 is also programmed with predefined threshold values for each parameter, representing the safe operating ranges. If any reading exceeds its threshold value, it triggers an immediate alert to indicate a potential problem. For instance, a temperature reading above the predefined threshold could signal an overheating issue, prompting immediate action.

To predict potential failures, the server leverages the historical sensor data and identified trends to forecast future parameter values. This is done using time-series forecasting methods such as autoregressive integrated moving average (ARIMA) or exponential smoothing. The forecasted values are then compared against the predefined thresholds to predict if and when a failure might occur.

The ARIMA (Autoregressive Integrated Moving Average) model is one of the most commonly used methods for forecasting time series data. It is particularly suited for data sets showing historical trends or seasonal patterns.

Inputs to the ARIMA model for predicting potential failures of current transformers would typically be:

Historical Sensor Data: This is the main input for the ARIMA model. This could be temperature readings, vibration measurements, current flow data, magnetic field readings, etc., collected over a period of time from the transformer. Each type of data would generally be modelled separately.

ARIMA Model Parameters (p, d, q): These are selected as part of the model building process, as explained in the previous responses. These parameters are integral to the structure of the ARIMA model.

Outputs from the ARIMA model would typically be:

Predicted Sensor Readings: Using the historical data and the defined ARIMA model, the model will output predicted future values for each of the sensor readings. These predictions give an estimation of the expected behavior of the transformer in the future.

Residuals: These are the differences between the actual and predicted values for the sensor data in the training set. These residuals are important for evaluating the performance of the model.

Health Status Forecast: By comparing the predicted future sensor readings against the predefined thresholds, a health status forecast for the transformer can be produced. If the predicted values exceed the thresholds, it suggests a potential future failure in the transformer.

Here's a detailed overview of how the server uses ARIMA for failure prediction:

(1) Data Preprocessing: Before applying the ARIMA model, the data is preprocessed to ensure that it's stationary, i.e., its properties do not depend on the time at which the series is observed. This usually involves differencing the data, transforming it, or even a combination of both, until the stationarity condition is met.

(2) Parameter Selection: ARIMA models are denoted as ARIMA(p,d,q) where 'p' is the order of the AutoRegressive part, 'd' is the order of differencing needed for stationarity, and 'q' is the order of the Moving Average part. The parameters p, d, and q are usually selected based on autocorrelation and partial autocorrelation plots or using methods such as the Akaike information criterion (AIC) or the Bayesian information criterion (BIC).

(3) Model Fitting: Once the parameters are chosen, the ARIMA model is fitted to the data using a method such as Maximum Likelihood Estimation. This process generates a fitted model that can best explain the historical data.

(4) Diagnostic Checking: After fitting the model, residuals (the difference between the actual and predicted values) are checked to ensure that they behave like white noise (i.e., they're normally distributed with zero mean and constant variance) and that they are not correlated. This is usually done by analyzing the residuals' plots and the autocorrelation function of the residuals.

(5) Forecasting: If the model passes the diagnostic check, it's then used to forecast future values. The model uses the current and past values (defined by 'p' and 'q') to predict future trends in the data.

(6) Threshold Comparison: The forecasted values are then compared to the predefined thresholds specific to each parameter (temperature, vibration, etc.). If the forecasted value crosses the threshold, an alert is generated, indicating a possible future failure.

(7) Updating the Model: As new data comes in, the model is updated or re-fitted to ensure it stays current. This might involve re-calculating the parameters and repeating the model fitting process.

Through this detailed ARIMA modelling and forecasting process, the server 402 is capable of leveraging past sensor data to predict future values, thereby enabling early detection of potential failures in the current transformers.

Furthermore, the server 402 has an alert and recommendation system built into it. When the trend analysis or failure prediction indicates a possible issue, the server 402 can automatically generate alerts or recommendations. For example, if the trend analysis suggests a transformer's service life is nearing its end, the server can trigger an automated maintenance work order for a thorough inspection or even initiate a procurement request for a replacement transformer.

Lastly, the server is equipped with a user interface that provides visualizations of the trend analysis and failure predictions. This helps operators better understand the transformer's condition and make informed decisions on maintenance or replacement.

By continuously analyzing sensor data, identifying trends, predicting potential failures, and generating automated alerts and recommendations, the server 402 plays a critical role in maintaining the health and reliability of the transformers, thus minimizing the risk of operational downtime.

The detailed description above sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The following is claimed:

1. A system for managing the health status of a current transformer, the system comprising: a current transformer comprising a built-in health self-diagnosis system, wherein the built-in health self-diagnosis system comprises a plurality of sensors configured to continuously monitor operational parameters indicative of the current transformer's performance and condition, wherein the operational parameters comprise transformer temperature, vibration levels, and magnetic field intensity; a power meter electrically coupled to the current transformer via a dedicated cable, the power meter configured to receive sensor data from the plurality of sensors via the dedicated cable, digitally encode a secondary current output from the current transformer to obtain current flow data, and transmit both the sensor data and the current flow data; and a server communicatively coupled to the power meter and configured to receive the sensor data and current flow data, process the received sensor data and current flow data according to predefined rules, wherein the predefined rules include statistical analyses of the operational parameters to assess the health status of the current transformer, and calculate a health index quantifying the current transformer's health based on weighted outcomes derived from the predefined rules.

2. The system of claim 1, wherein the plurality of sensors comprises: a temperature sensor configured to detect overheating; an accelerometer configured to measure vibration levels indicating potential mechanical issues; and a magnetic field sensor configured to detect deviations from expected magnetic field intensity.

3. The system of claim 1, wherein the dedicated cable comprises a Serial Peripheral Interface (SPI) bus integrated onto a printed circuit board within the current transformer, wherein the SPI bus transmits the sensor data from the built-in health self-diagnosis system to the power meter in a full duplex communication mode.

4. The system of claim 1, wherein the SPI bus incorporates error checking via a Cyclic Redundancy Check (CRC) mechanism to ensure reliability and integrity of transmitted sensor data.

5. The system of claim 1, wherein the predefined rules comprise: an overheating rule activated when the mean transformer temperature measured over a predetermined period exceeds a specified threshold; a vibration rule activated when the variance in measured vibration levels exceeds a specified threshold; and a magnetic field discrepancy rule activated when the measured magnetic field intensity deviates from an expected value by more than a predefined percentage.

6. The system of claim 1, wherein the server is further configured to: maintain a historical database of sensor data categorized by sensor type, transformer serial number, date, and timestamp; perform trend analysis on historical sensor data to identify patterns indicative of potential transformer issues; and predict potential transformer failures by forecasting future values of operational parameters using time-series forecasting methods and comparing these forecasted values to predetermined thresholds.

7. The system of claim 6, wherein the time-series forecasting methods include an Autoregressive Integrated Moving Average (ARIMA) model configured to analyze historical sensor data to forecast future operational parameter values.

8. The system of claim 6, wherein the server further generates automated alerts or recommendations upon detecting potential transformer issues based on trend analysis or forecasting, wherein recommendations comprise initiating transformer maintenance procedures or procurement of a replacement transformer.

9. The system of claim 1, wherein the power meter is further configured to: receive the calculated health index from the server; display the health status on a user interface; and adjust transformer measurement and calibration routines according to the received health status to maintain accuracy in current measurements.

10. A method for managing the health status of a current transformer, the method comprising: continuously monitoring operational parameters indicative of the transformer's performance and condition using a built-in health self-diagnosis system integrated within the current transformer, wherein operational parameters include transformer temperature, vibration levels, and magnetic field intensity; transmitting sensor data indicative of the operational parameters from the current transformer to a power meter via a dedicated cable; digitally encoding, by the power meter, the secondary current output from the current transformer to generate current flow data; transmitting both the sensor data and the current flow data from the power meter to a server; processing the sensor data and current flow data at the server according to predefined rules comprising statistical analyses of the operational parameters to assess the health status; and calculating a health index at the server based on weighted outcomes derived from the predefined rules, wherein the health index quantifies the health status of the current transformer.

11. The method of claim 10, further comprising: storing historical sensor data at the server categorized by sensor type, transformer serial number, date, and timestamp; performing trend analysis on historical sensor data to identify patterns indicative of potential transformer issues; and predicting potential transformer failures by forecasting future operational parameter values using an Autoregressive Integrated Moving Average (ARIMA) model, and comparing the forecasted values against predetermined thresholds.

12. The method of claim 11, wherein transmitting sensor data via the dedicated cable comprises using a Serial Peripheral Interface (SPI) bus configured with a Cyclic Redundancy Check (CRC) mechanism to verify integrity and reliability of sensor data transmission.

* * * * *